United States Patent
El Hamss et al.

(10) Patent No.: US 12,206,448 B2
(45) Date of Patent: Jan. 21, 2025

(54) CHANNEL ACCESS IN UNLICENSED SPECTRUM

(71) Applicant: InterDigital Patent Holdings, Inc., Wilmington, DE (US)

(72) Inventors: Aata El Hamss, Laval (CA); J. Patrick Tooher, Montreal (CA); Ghyslain Pelletier, Montreal (CA); Faris Alfarhan, Montreal (CA); Paul Marinier, Brossard (CA)

(73) Assignee: Inter Digital Patent Holdings, Inc., Wilmington, DE (US)

( * ) Notice: Subject to any disclaimer, the term of this patent is extended or adjusted under 35 U.S.C. 154(b) by 343 days.

(21) Appl. No.: 17/799,107

(22) PCT Filed: Feb. 12, 2021

(86) PCT No.: PCT/US2021/017763
§ 371 (c)(1),
(2) Date: Aug. 11, 2022

(87) PCT Pub. No.: WO2021/163411
PCT Pub. Date: Aug. 19, 2021

(65) Prior Publication Data
US 2023/0072340 A1 Mar. 9, 2023

Related U.S. Application Data

(60) Provisional application No. 63/091,355, filed on Oct. 14, 2020, provisional application No. 63/061,436, (Continued)

(51) Int. Cl.
*H04B 1/74* (2006.01)
*H04W 74/0808* (2024.01)
(Continued)

(52) U.S. Cl.
CPC .......... *H04B 1/74* (2013.01); *H04W 74/0808* (2013.01); *H04W 74/0833* (2013.01)

(58) Field of Classification Search
CPC ................ H04B 1/74; H04W 74/0808; H04W 74/0833; H04W 74/006
See application file for complete search history.

(56) References Cited

U.S. PATENT DOCUMENTS

2017/0223744 A1* 8/2017 Qian ................. H04W 74/0833
2018/0368005 A1* 12/2018 Fukui .................. H04B 7/0695
(Continued)

OTHER PUBLICATIONS

3$^{rd}$ Generation Partnership Program (3GPP), RP-193259, "New SID: Study on supporting NR from 52.6GHz to 71 GHz", Intel Corporation, 3GPP TSG-RAN Meeting #86, Sitges, Spain, Dec. 9-12, 2019, 3 pages.

*Primary Examiner* — Eunsook Choi
(74) *Attorney, Agent, or Firm* — Condo Roccia Koptiw LLP

(57) ABSTRACT

Channel access in unlicensed spectrum may be a function of the type of physical channel and/or a procedure that initiated a transmission. An LBT procedure may be performed as a function of beam management. A WTRU may access a channel using multiple channel access methods associated with multiple uplink transmissions based on a determination of persistent interference associated with the channel. Channel access methods may be performed with different parameters or characteristics based on the resource type/timing of the transmission/measurements of DL/UL RS. Channel access methods may be characterized by a sensing duration, an ED threshold, a beam width, and/or a beam direction. Different ED thresholds may be applied as a function of one or more characteristics of an applicable beam. Multiple sensing methods and/or related parameters may be applied (Continued)

as a function of the type of physical channel and/or the type of procedure associated with a transmission.

15 Claims, 10 Drawing Sheets

Related U.S. Application Data filed on Aug. 5, 2020, provisional application No. 62/975,362, filed on Feb. 12, 2020.

(51) Int. Cl.
*H04W 74/0833* (2024.01)
*H04W 74/08* (2024.01)

(56) References Cited

U.S. PATENT DOCUMENTS

| | | | |
|---|---|---|---|
| 2019/0104542 A1* | 4/2019 | Chendamarai Kannan | ................. H04W 74/002 |
| 2019/0104546 A1 | 4/2019 | Chendamarai et al. | |
| 2019/0373635 A1 | 12/2019 | Yang et al. | |
| 2020/0252806 A1* | 8/2020 | Yerramalli | .......... H04W 72/541 |
| 2020/0259621 A1* | 8/2020 | Oh | ........................ H04L 1/1822 |
| 2021/0314780 A1* | 10/2021 | Tomeba | ................. H04W 16/14 |
| 2021/0392683 A1* | 12/2021 | Awadin | .................. H04B 7/088 |
| 2021/0410187 A1* | 12/2021 | Yang | ................... H04W 74/006 |

\* cited by examiner

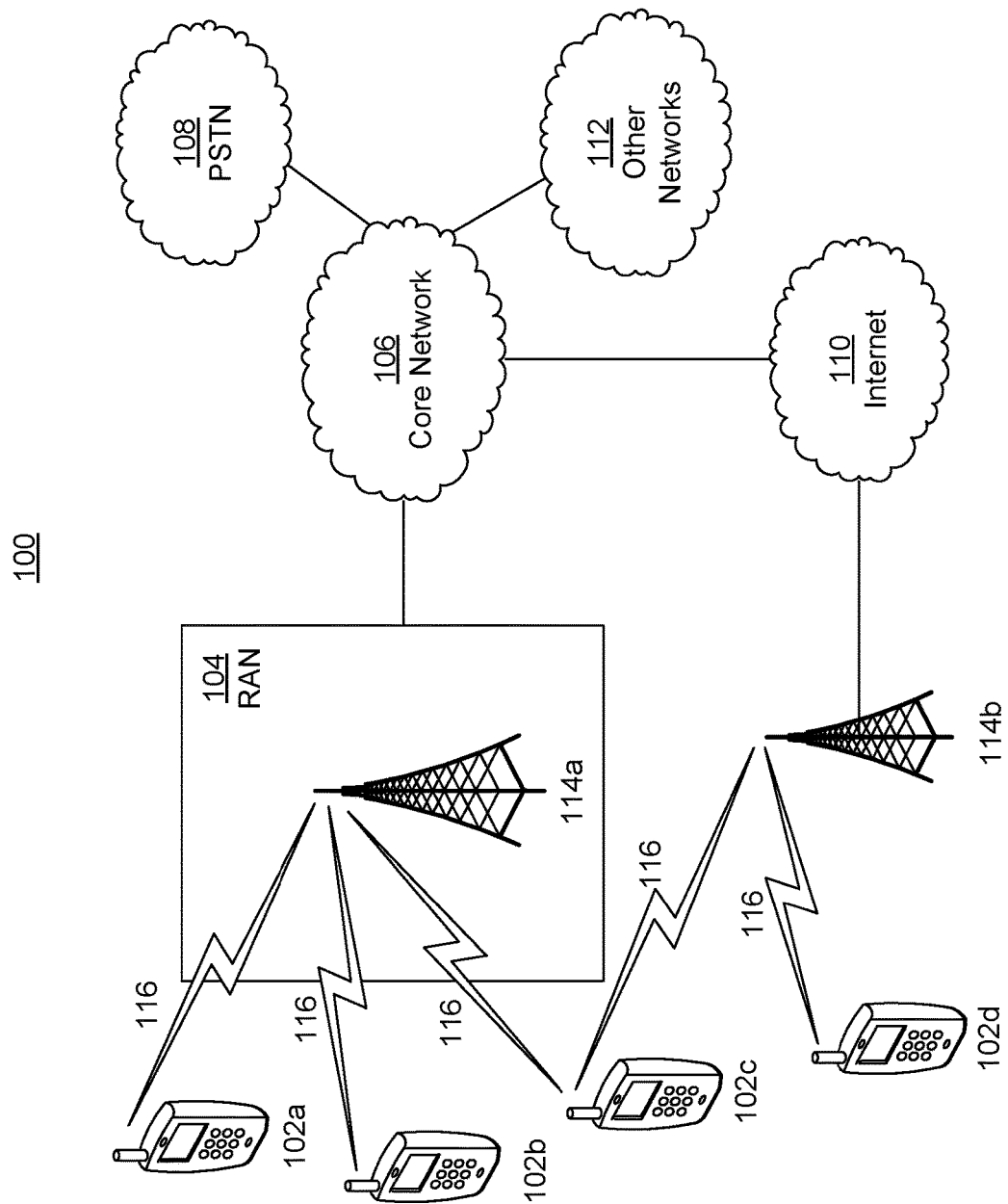

WTRU senses the energy in directional beam for duration d1

WTRU senses the energy in omni-directional beam for duration d1

WTRU receives type 1 channel access indication

WTRU senses the energy in multi-directional beam for duration d1

WTRU senses the energy in omni-directional beam for duration d1

WTRU receives type 1 channel access indication

CHANNEL ACCESS IN UNLICENSED SPECTRUM

CROSS-REFERENCE TO RELATED APPLICATIONS

This application is the National Stage Entry under 35 U.S.C. § 371 of Patent Cooperation Treaty Application No. PCT/US2021/017763, filed Feb. 12, 2020, which claims the benefit of U.S. Provisional Patent Application No. 62/975,362, filed Feb. 12, 2020, U.S. Provisional Patent Application No. 63/061,436, filed Aug. 5, 2020, and U.S. Provisional Patent Application No. 63/091,355, filed Oct. 14, 2020, the contents of which are hereby incorporated by reference in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Channel access in (e.g., high frequency) unlicensed spectrum is disclosed. A wireless transmit/receive unit (WTRU) may access a channel using multiple channel access methods associated with multiple uplink transmissions based on a determination of persistent interference associated with the channel.

Channel access in (e.g., high frequency) unlicensed spectrum may be implemented, for example, as a function of the type of physical channel and/or a procedure that initiated a transmission. A wireless transmit/receive unit (WTRU) may apply one of multiple sensing methods and/or related parameters, for example, as a function of the type of physical channel and/or the type of procedure associated with a transmission. A WTRU may perform listen-before-talk (LBT) for (e.g., before) a transmission. For example, a WTRU may select an appropriate LBT configuration as a function of the associated transmission, such as a transmission that triggers the LBT procedure or a transmission that occurs in a channel occupancy time (COT) acquired using the LBT procedure. A WTRU may receive (e.g., from a network node) an indication of an LBT configuration that may be used to initiate a COT or an LBT configuration to be used to continue using the COT. A WTRU may indicate to a network node (e.g., a next generation Node B (gNB)) an LBT configuration used to initiate a COT or may continue using a gNB initiated COT. A WTRU may maintain multiple spatial COTs. Each of multiple spatial COTs may be associated with a different LBT configuration. A WTRU may maintain multiple uplink (UL) LBT counters/timers. Each of multiple UL LBT counters/timers may be associated with different LBT configurations.

A WTRU may perform an LBT procedure (e.g., for a transmission), for example, as a function of beam management. For example, a WTRU may apply different energy detect (ED) thresholds as a function of one or more characteristics of an applicable beam. A WTRU may perform one or more channel access methods prior to a transmission with (e.g., using) different parameters and/or characteristics, for example, based on the resource type/timing of the transmission/measurements of one or more downlink (DL)/uplink (UL) reference signals (RS). A channel access method may be characterized, for example, by a sensing duration, an ED threshold, a beam width, and/or a beam direction. A WTRU may determine persistent interference (e.g., associated with a channel), for example, based on a number of retransmission(s) of a transport block (TB) compared to (e.g., above) a (e.g., configured) threshold. A WTRU may use a counter per TB. A WTRU may increment a counter, for example, if a retransmission occurs for a TB. A WTRU may determine a persistent interference, for example, if the WTRU does not receive a downlink feedback information (DFI) for N consecutive times. A WTRU may be configured with one or more blank resource elements. A WTRU may monitor the resource elements, for example, to detect if there is persistent interference.

In examples, methods may be implemented for channel access in unlicensed spectrum. Methods may be implemented (e.g., in whole or in part), for example, by one or more devices, apparatuses, and/or systems (e.g., a WTRU, a network node, and/or the like), which may comprise one or more processors configured to execute the methods (e.g., in whole or in part) as computer executable instructions that may be stored on a computer readable medium or a computer program product, that, when executed by the one or more processors, performs the methods. The computer readable medium or the computer program product may comprise instructions that cause one or more processors to perform the methods by executing the instructions.

In examples, a WTRU may include a processor configured (e.g., programmed with executable instructions to implement a method) to receive configuration information that indicates a first channel access method and a second channel access method; select the first channel access method associated with a first uplink transmission on a channel; access the channel via the first channel access method and transmit the first uplink transmission on the channel; determine that there is persistent interference associated with the channel; based on the determination that there is persistent interference associated with the channel, select the second channel access method associated with a second uplink transmission; and access the channel via the second channel access method and transmit the second uplink transmission on the channel.

The first channel access method may comprise the channel being sensed for a first duration using a first beam. The second channel access method may comprise the channel being sensed for a second duration using a second beam and the channel being sensed for a third duration using a third beam. The first beam may be, for example, a first directional beam. The second beam may be, for example, an omni-directional beam. The third beam may be, for example, a second directional beam.

The processor may be (e.g., further) configured (e.g., programmed with executable instructions to implement a method) to perform one or more actions. The one or more actions may comprise, for example, one or more of the following: measure a periodic downlink reference signal, determine a number of retransmissions performed for an uplink transport block, determine a failure to receive a HARQ ACK or HARQ NACK associated with the first transmission, and/or determine expected responses for transmissions. The determination that there is persistent interference associated with the channel may be based on the performed action(s).

BRIEF DESCRIPTION OF THE DRAWINGS

FIG. 1A is a system diagram illustrating an example communications system in which one or more disclosed embodiments may be implemented.

DETAILED DESCRIPTION

Figure 1B:
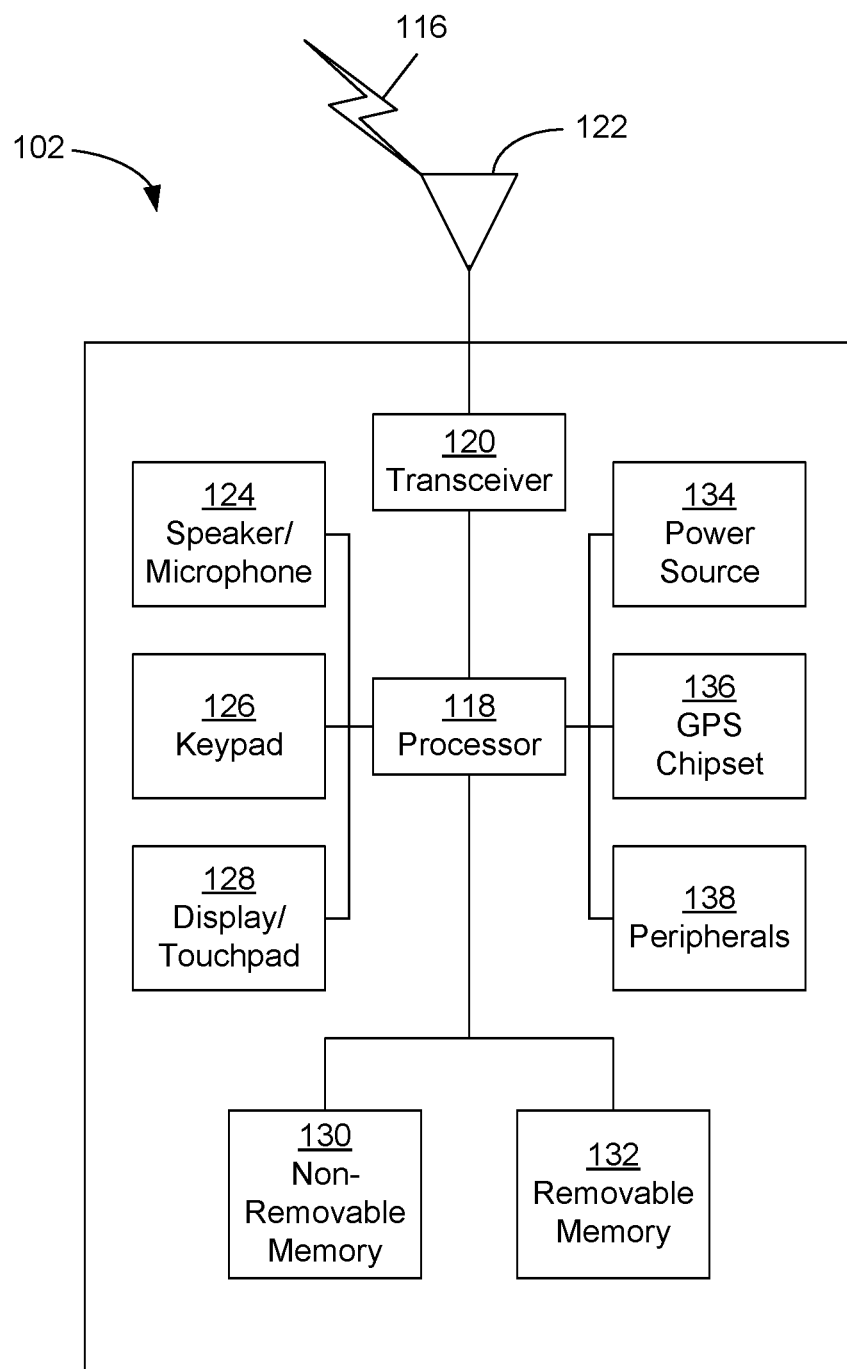
FIG. 1B is a system diagram illustrating an example wireless transmit/receive unit (WTRU) that may be used within the communications system illustrated in FIG. 1A according to an embodiment.

Channel access in unlicensed spectrum may be a function of the type of physical channel and/or a procedure that initiated a transmission. A listen-before-talk (LBT) procedure may be performed as a function of beam management. A wireless transmit/receive unit (WTRU) may access a channel using multiple channel access methods associated with multiple uplink transmissions based on a determination of persistent interference associated with the channel. Channel access methods may be performed with different parameters or characteristics based on the resource type/timing of transmission/measurements of downlink (DL) and/or uplink (UL) reference signals (RS). Channel access methods may be characterized by a sensing duration, an energy detection (ED) threshold, a beam width, and/or a beam direction. Different ED thresholds may be applied as a function of one or more characteristics of an applicable beam. Multiple sensing methods and/or related parameters may be applied as a function of the type of physical channel and/or the type of procedure associated with a transmission.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
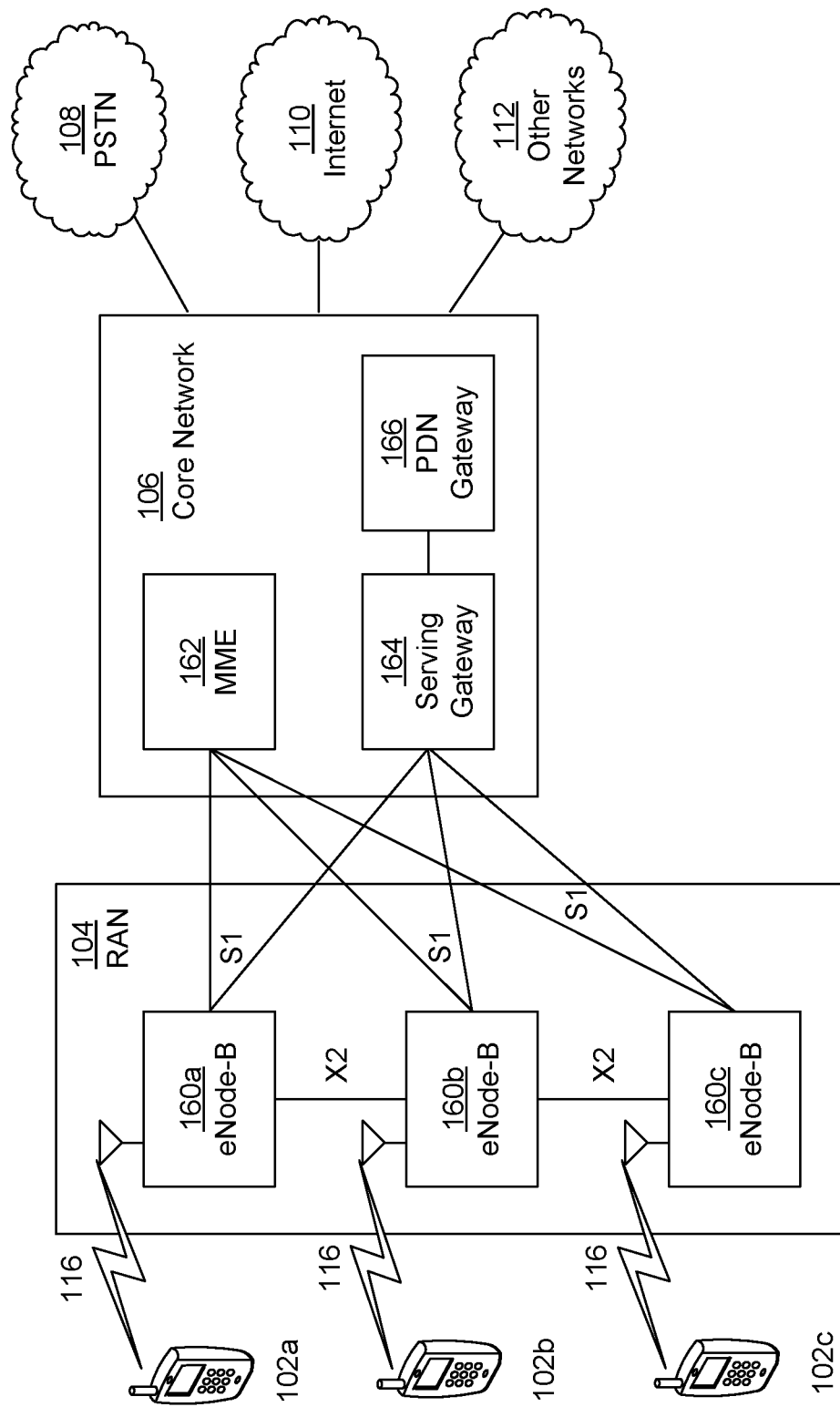
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
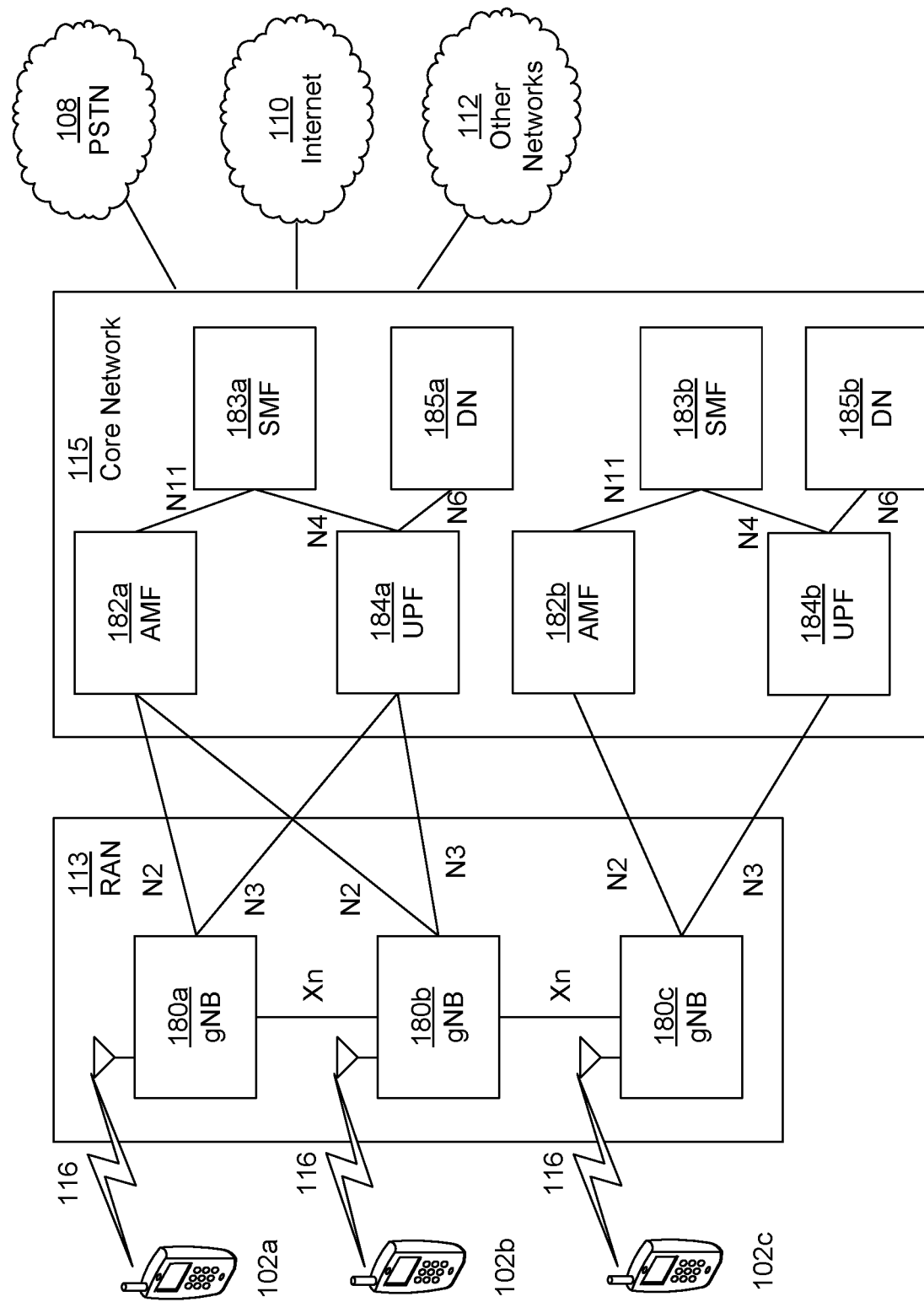
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Wireless technologies (e.g., using new radio (NR) as an example), may support the use of unlicensed bands (e.g., up to 52.6 GHz and/or higher frequencies, such as 52.6 GHz to 71 GHz). NR may implement, for example, high data rate enhanced mobile broadband (eMBB), mobile data offloading, short range high data rate device-to-device (D2D) communication, and industrial Internet of Things (IoT). Frequency ranges above 52.6 GHz may include larger spectrum allocation and large bandwidth. Transmissions on frequencies above 52.6 GHz may experience high phase noise, large propagation loss, low power amplifier efficiency, and/or strong power spectral density regulatory requirements. Channel access may be improved (e.g., enhanced), for example, by considering potential interference to/from other nodes (e.g., for beam-based operation), and complying with regulatory requirements for use of unlicensed spectrum (e.g., for frequencies between 52.6 GHz and 71 GHz).

Transmissions on high frequency bands may experience a high propagation loss, for example, due to channel characteristics on high frequency bands (e.g., high atmospheric absorption). Beam-based transmission may be used with high frequencies, for example, to direct power on a specific beam direction. Clear channel assessment (CCA) may be used, for example, before starting a transmission. Energy detection during CCA may be performed on a beam, for example, to enable spatial multiplexing/reuse. Directional CCA may increase the impact of a hidden node problem, for example, if a WTRU is unable to detect interfering nodes.

Figure 2:
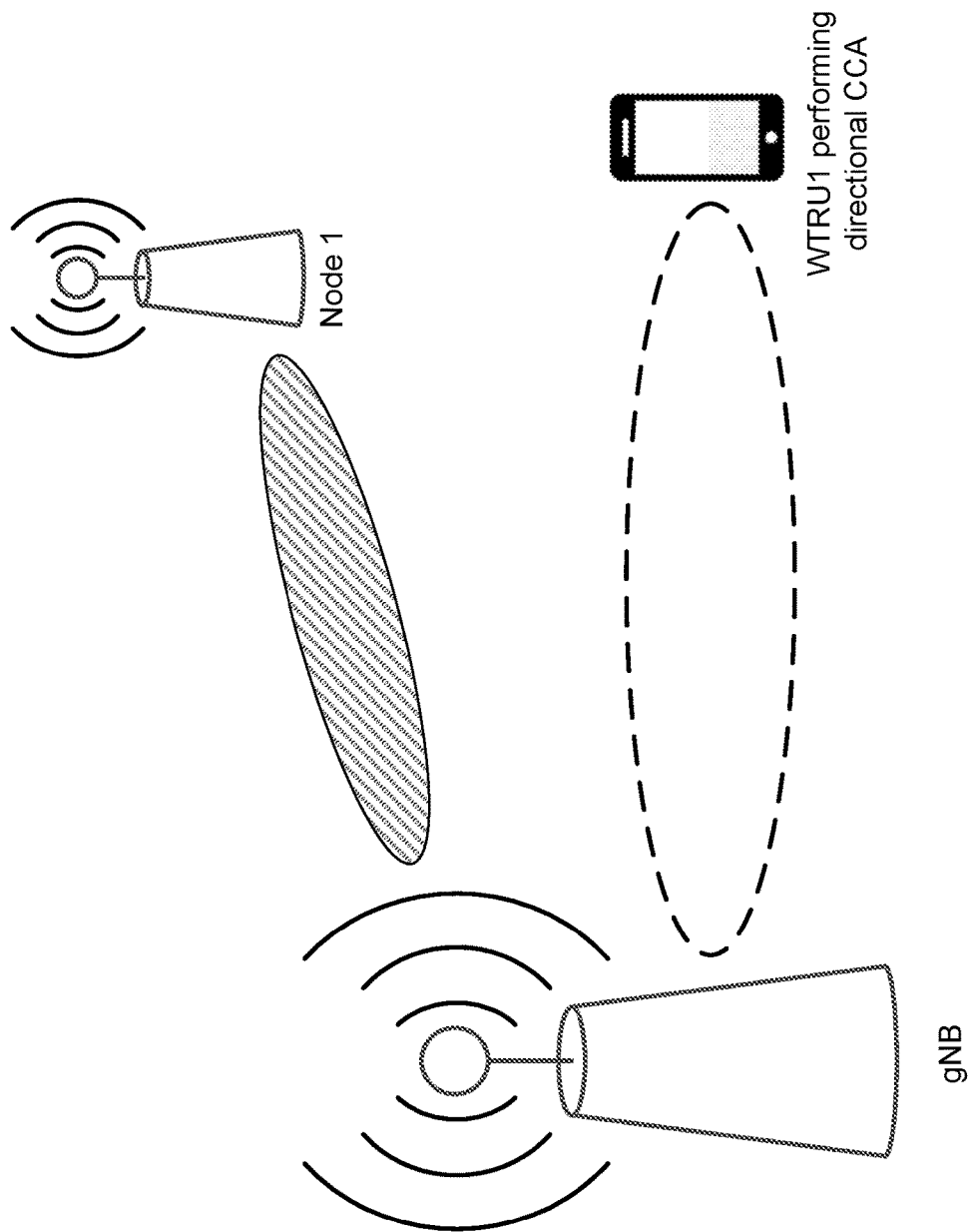
FIG. 2 is a diagram illustrating an example of a failure to detect an interfering node.

FIG. 2 is a diagram illustrating an example of a failure to detect an interfering node. In examples (e.g., as shown in FIG. 2), a WTRU (e.g., WTRU1) may intend to transmit to a gNB using beam-based transmission and directional CCA. Directional CCA may fail to detect a transmission by Node 1 (e.g., as shown in FIG. 2). Omni-directional transmissions may occur on higher frequency ranges, for example, to target a very short communication range. Broadcast transmissions for sidelink may be used for short range communications, for example, by using omni-directional transmissions and omni-directional CCA. Omni-directional CCA may have a different energy detection (ED) threshold compared to directional CCA ED. A WTRU that (e.g., always) performs directional CCA may cause interference for other nodes using omni-directional CCA.

The impact of hidden nodes may be reduced, for example, while using directional CCA for unlicensed spectrum operations to increase spatial multiplexing capacity. The subject matter may be applied, for example, to a WTRU, a gNB, an eNB and any transmitting node that may use unlicensed spectrum (e.g., a WiFi access point).

Beam management may be provided. Beams (e.g. at higher frequencies) may be characterized, for example, based on beam identities and/or management processes.

A beam may be associated with a beam identity (beam ID) or a beam index. A beam index may be unique to downlink (DL) and/or uplink (UL). For example, a downlink beam may identify a downlink beam and an associated uplink beam. The association between uplink and downlink beams may be configured and/or implicitly determined, for example, based on the outcome of a beam management process and the associated UL and DL frequencies.

A WTRU may maintain a beam management process, for example, to determine which beam IDs to maintain, activate, deactivate, and/or consider as a candidate for activation, among other actions. A beam management process may keep track of a list of maintained beams and a list of candidate beams. A beam management process may (e.g., also) perform actions related to beam failure detection (BFD) and/or beam failure recovery (BFR). A beam management process may (e.g., also) be used to change beam states. A (e.g., each) beam may have at least one of the following states: (i) active and/or maintained; (ii) de-active; (iii) candidate; (iv) initial state; and/or (v) adjusted state.

A WTRU may (e.g., for a beam in an active and/or maintained state) measure an associated channel state information reference signal (CSI-RS) or synchronization signal blocks (SSBs), e.g., part of BFD. The WTRU may monitor associated physical downlink control channel (PDCCH) resources or search spaces. The WTRU may activate a beam, for example, after reception of activation signaling, such as by semi-static configuration (e.g., a default active beam), and/or after measuring a channel state quantity for an associated measurement resource below a configured threshold.

A WTRU may (e.g., for a beam in a de-active state) not measure associated CSI-RS or SSBs, e.g., part of BFD. The WTRU may de-activate a beam, for example, after reception of de-activation signaling, after declaring a beam failure, and/or after measuring a channel state quantity for an associated measurement resource below a configured threshold.

A beam in a candidate state may (e.g. also) be a de-active beam. A beam ID may be a candidate, for example, if configured by higher layer signaling or determined by the WTRU (e.g., based on channel condition measurements on associated CSI-RS/SSBs). A WTRU may measure associated CSI-RS and/or SSBs, for example, as part of BFR for a candidate beam (e.g., for beam reselection).

A beam in an initial state may be transmitted/received with default parameters (e.g., beamwidth, etc.).

A beam in an adjusted state may be transmitted/received with modified parameters.

Beam configuration and characteristics may be provided (e.g., configured). Beam shaping and/or patterns may be provided. A beam may be characterized, for example, by at least one of the following: (i) beam parameters; (ii) beam width or directivity index; (iii) beam type; (iv) beam reference signal; and/or (v) beam transmission configuration indicator (TCI) state(s).

A beam may be characterized by beam parameters. Beam parameters may include one or more of the following: applied (e.g., spatial) filter, codebook(s), precoding table(s) and/or weight(s), RF phase shift(s), Channel State Information (CSI). Beam parameters may exist for a downlink beam, an uplink beam, and/or a bidirectional beam. A channel may be reciprocal (e.g., time division duplex (TDD)) or not reciprocal (e.g., frequency division duplex (FDD)), etc. In examples, a WTRU may be configured with a plurality of beams. Each beam in the plurality of beams may be associated with a different set of parameter(s) (e.g., each with an assigned value or value range). For example, a WTRU may be configured with a plurality of beams, where each beam may be associated with a specific spatial filter.

A beam may be characterized by beam width and/or a beam directivity index. For example, a WTRU may be configured to associate a beam with a "width." A beam width may correspond to a set of beam parameter(s). For example, a beam width may correspond to one or more weighting patterns. A beam width may correspond to a specific spatial filter.

A beam may be characterized by a beam type. For example, a beam may be omnidirectional or directional, which may be considered a special case of the beam width characterization.

A beam may be characterized by a beam reference signal. For example, a beam may be associated with a synchronization signal block (SSB), and/or a channel state information reference signal (CSI-RS), for example, for the purpose of measuring the quality of the DL beam, beam failure detection, and/or identifying a beam.

A beam may be characterized by beam TCI state(s). A beam may be associated with one or more TCI states. A network may use a TCI, for example, to indicate the (de)-activation status of a given beam for a PDCCH and/or physical downlink shared channel (PDSCH) transmission. A beam may (e.g. also) be associated with an uplink TCI state.

There may be beam related requirements for higher frequencies. For example, a WTRU implementation may meet requirements for one or more beam characteristics, which may be a testing aspect of the WTRU implementation. In examples, testing may include the expected pattern of radiation, the spectral leakage of the radiation pattern, etc. Different WTRU implementations may, for example, conform to specific (e.g., selected, determined, configured) sensitivity levels, spectral emission patterns, e.g., to support different beams meeting specific requirements.

A WTRU may have capabilities for beam-related requirements for higher frequencies. For example, a WTRU implementation may support one or more requirements to make available different beams with different interference characteristics and/or beam widths. A WTRU may report beam availability to the network, for example, as part of a WTRU capability exchange.

A WTRU may be configured for beam-related requirements for higher frequencies. A WTRU may be configured with a plurality of beams (e.g. as discussed herein). For example, a WTRU may be configured with beam ID=0 (e.g., for an omnidirectional beam) and with beam ID!=0 (e.g., for directional beams). A WTRU may be (e.g., further) configured with one or more directional beams. For example, a WTRU may be configured with beam ID=1 (e.g., associated with a first beam width x=1), with beam ID=2 (e.g., associated with a second beam width x=2), and so on (e.g., up to a maximum number of beams). In examples, the maximum number of directional beams may be a WTRU capability.

A WTRU may be configured for beam width control. A WTRU may be configured with a reference signal (e.g., SSB, CSI-RS) configuration for a given beam. A WTRU may be configured with a (e.g., one) reference signal configuration assigned to a plurality of beam widths. A beam reference signal configuration may be associated with a plurality of beam width indices. A (e.g., each) index may correspond to (e.g., at most) one beam width. A beam (e.g. in such a scenario) may be defined, for example, based on the beam's reference signal configuration, e.g., where control thereof may be associated with changes in the beam width index. A beam width index may correspond to a beam ID.

Beam control may be provided (e.g. in downlink control information (DCI)). A WTRU may receive control signaling (e.g., on a first beam carrying the control channels, such as PDCCH). Control signaling may include an index to a beam configuration for: (i) the reception of data (e.g., for a DL beam on a data channel such as PDSCH), (ii) the transmission of data (e.g., for a bi-directional beam on an uplink channel such as a physical uplink shared channel (PUSCH), (iii) and/or the transmission of control information (e.g., for a bi-directional beam on an uplink control channel such as a physical uplink control channel (PUCCH) using the indicated beam configuration.

A WTRU may receive control signaling that indicates the (de)-activation of a beam configuration, beam index, and/or associated beamwidth(s). The (de)-activation indication may be applicable to a specific direction (e.g., downlink), a specific channel (e.g., PDCCH, PDCCH, PUSCH, PUCCH, physical random access channel (PRACH)), and/or for a subset of transmission types (e.g., paging, uplink control information (UCI) type, data type). Control signaling may be, for example, dynamic (e.g., received on a MAC control element (CE) or DCI) or semi-static (e.g., received by radio resource control (RRC) (re)-configuration).

Beam reference signals may be WTRU-specific. A WTRU may be configured with WTRU-specific reference signals (e.g., SSB, CSI-RS) for one or more beams of the WTRU's configuration. A WTRU may receive a configuration, for example, using L3/RRC signaling.

A reference signal (RS) configuration may be a function of a beam index. For example, a WTRU may be configured with one or more indices (e.g., representing a beam and/or a beam width) that may (e.g., each) be associated with a reference signal configuration. A WTRU may determine an applicable resource allocation (e.g., in time and/or frequency) for a given index, e.g., using the associated configuration.

A measurement threshold may be a function of beam management. A WTRU may be configured with measurement configurations specific to a beam characteristic (e.g., beam type, beam width, beam ID, or the likes). For example, a WTRU may perform specific link and/or connectivity management procedures as a function of a specific beam configuration. A WTRU may be configured with a default beam and may use a configuration associated with a default beam, for example, if no other beam is selected (e.g., for scheduled transmission(s)). A WTRU may use a default, for example, when the time alignment timer (TAT) is not running, when the WTRU is in discontinuous reception (DRX) inactive time, and/or under a period of limited (e.g., if any) scheduling activity for unicast transmissions. A measurement configuration may include, for example, configurations related to beam management, configurations for radio link monitoring (RLM), configurations for mobility management and/or measurement reporting, configurations for measurements related to CSI reporting, and/or configurations for sensing in unlicensed spectrum (e.g., energy detection level, sensing duration).

Multiple concurrent channel access methods may be maintained. A channel access method may refer to an LBT mechanism (e.g., method/procedure) performed by a WTRU prior to transmitting in unlicensed channel and/or spectrum.

A WTRU may be configured to perform a channel access method, for example, before transmitting on an unlicensed band. A channel access method may be characterized and/or parametrized, for example, by at least one of the following: (i) a spatial filter setting; (ii) a sensing duration; (iii) an energy detection threshold; (iv) a contention window size; and/or (v) a priority of the transmission triggering channel access procedure.

A channel access method may be characterized and/or parametrized, for example, by a spatial filter setting, e.g., for sensing energy during the sensing duration(s). For example, a channel access method may be characterized by the beam on which a transmitting WTRU may detect (e.g., is detecting) the energy prior to the transmission. A beam configuration may include, for example: beam width, beam direction, scale-factors, and/or phase shifts.

A channel access method may be characterized and/or parametrized, for example, by a sensing duration, e.g., during which a WTRU may be performing a CCA. A sensing duration may be contiguous (e.g., in the time domain) or discontinuous. Gaps between different intervals may depend, for example, on the spatial filter setting used to sense the channel.

A channel access method may be characterized and/or parametrized, for example, by an energy detection threshold. For example, a channel access method may be parametrized by an ED threshold (e.g., for use by a WTRU to determine whether the channel is busy). An energy threshold may be a function of, for example, one or more of the following: (i) transmit power (e.g., intended transmit power to be used by a WTRU), (ii) the frequency band, and/or (iii) the spatial filter setting.

A channel access method may be characterized and/or parametrized, for example, by a contention window size (CWS). A CWS may be used, for example, to select a random number of energy sensing slots.

A channel access method may be characterized and/or parametrized, for example, by a priority of the transmission triggering channel access procedure (e.g., a channel access priority class).

A WTRU may be (pre)configured with a set of channel access methods. In examples, each channel access method may have (e.g., compared to another channel access method) different parameters/characterization. For example, a WTRU may be configured with multiple channel access methods having different beam directions. A WTRU may be configured with multiple channel access methods having different beam widths. A WTRU may be configured with different channel access methods with different ED thresholds.

A channel access method may include a set of channel access methods. For example, a channel access method may include a first channel access method characterized by a beam direction, a beam width, and/or a sensing duration, followed by a second channel access method characterized by a different beam direction, a different beam width, and/or a different sensing duration.

Channel access methods may be selectable. In examples, a WTRU may be configured to select one or more channel access methods. For example, a WTRU may be configured to select a directional CCA with (e.g., particular) parameters and/or characteristics (e.g., beam width, ED threshold). A WTRU may be configured to select multiple (e.g., two) channel access methods from (pre)configured channel access sets (e.g., an omni-directional CCA and a directional CCA). A WTRU may start sensing a channel within an omni-directional range and (e.g., then) use a directional beam to sense the channel. A WTRU may be configured to select one or more (e.g., a set of) channel access methods, for example, based on one or more of the following: (i) a channel access category indicated by the gNB (e.g., listen-before-talk (LBT) type); (ii) the type of transmission; (iii) a priority of a transmission; (iv) a resource intended for transmission; (v) a physical channel or transport channel associated with the transmission; (vi) a WTRU's procedures; (vii) a channel access priority class; (viii) a timing of a transmission; (ix) measurements of one or more downlink reference signals and/or one or more reported uplink reference signals associated with a set of beams; (x) a CWS state; (xi) an RRC state of a WTRU; and/or (xii) a direction of a sensing beam.

A WTRU may be configured to select a set of channel access methods, for example, based on a channel access category indicated by the gNB (e.g., LBT type).

Figure 3:
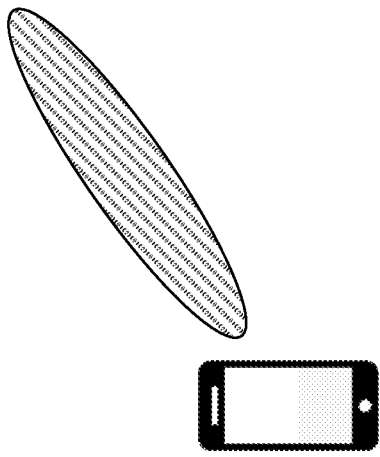
FIG. 3 is a diagram illustrating an example of an omni-directional clear channel assessment (CCA) and a directional CCA.
Figure 3:
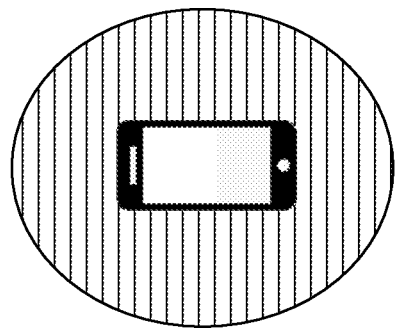
Figure 3:
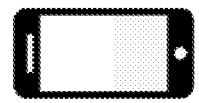

FIG. 3 is a diagram illustrating an example of an omni-directional CCA and (e.g., followed by) a directional CCA. For example, as shown in FIG. 3, a WTRU may (e.g., for type 1 channel access) perform an omni-directional CCA and (e.g., followed by) a directional CCA (e.g., in a specific direction). The duration of sensing may depend on the channel access method or the CCA type (e.g. omni-directional, multi-directional, or directional). The duration of sensing (e.g., number of slot sensing durations) for a (e.g., each) channel access method may be based on the priority of the transmission (e.g., channel access class p indicated in a scheduling DCI).

Figure 4:
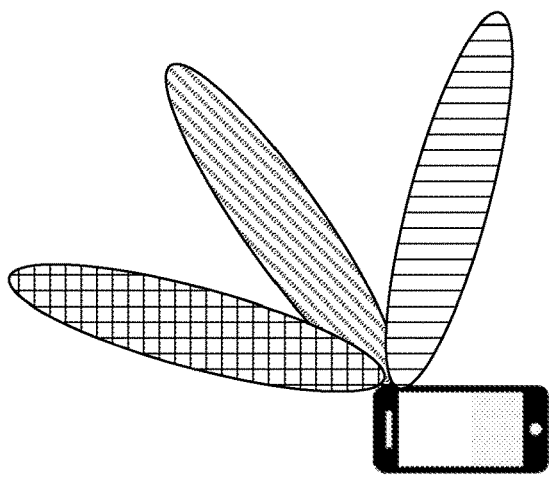
FIG. 4 is a diagram illustrating an example of an omni-directional CCA and a multi-directional CCA.
Figure 4:
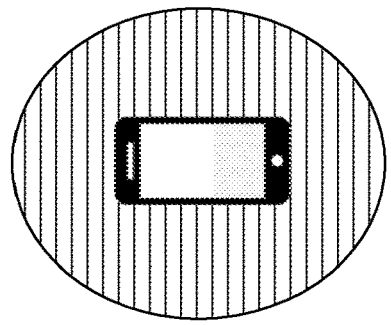
Figure 4:
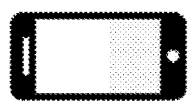

FIG. 4 is a diagram illustrating an example of an omni-directional CCA and (e.g., followed by) a multi-directional CCA. For example, as shown in FIG. 4, a WTRU may (e.g., for type 1 channel access) perform an omni-directional CCA and (e.g., followed by) a multi-directional CCA. In an (e.g., another) example, a WTRU may (e.g., for an indicated type 2 channel access, such as LBT category 2 in NR-U), a WTRU may perform (e.g., only) one channel access method (e.g., directional LBT or omni-directional), e.g., given that the gNB may share its channel occupancy time with WTRUs.

A WTRU may be configured to select one or more (e.g., a set of) channel access methods, for example, based on the type of transmission (e.g., control information, data transmission, and/or random-access transmission). A WTRU may be configured to use a (e.g., first) set of channel access methods, for example, if/when transmitting uplink control information (UCI), and a different (e.g., second) set of channel access methods, for example, if/when transmitting uplink data.

A WTRU may be configured to select one or more (e.g., a set of) channel access methods, for example, based on the priority of a transmission. For example, a WTRU may use directional a CCA for low priority transmissions that may have a high data rate and/or more tolerance for latency (e.g. an eMBB type of service). Use of a directional CCA for eMBB WTRUs may support (e.g., enable) spatial multiplexing that can tolerate a certain level of interference.

A WTRU may be configured to select one or more (e.g., a set of) channel access methods, for example, based on the resource intended for transmission. For example, a WTRU may select an omni-directional CCA for one or more (e.g., some) sub-bands and/or a bandwidth part (BWP).

A WTRU may be configured to select one or more (e.g., a set of) channel access methods, for example, based on the physical channel or transport channel associated with the transmission. For example, the uplink channel (e.g., PRACH, PUCCH or PUSCH) may be associated with a channel access method.

A WTRU may be configured to select one or more (e.g., a set of) channel access methods, for example, based on the WTRU's procedures (e.g., for contention-based or contention-free random access (RA)).

A WTRU may be configured to select one or more (e.g., a set of) channel access methods, for example, based on the channel access priority class. For example, a WTRU may sense a set of beams for a priority class. A set of beams may be associated with a set of channel access priority classes (CAPCs).

A WTRU may be configured to select one or more (e.g., a set of) channel access methods, for example, based on the timing of a transmission. A set of channel access methods may be selected, for example, based on whether the transmission is within a discovery reference signal (DRS) window or frame-based equipment (FBE) channel access window. For example, a WTRU transmitting on a DRS window may perform an omni-directional CCA. A set of channel access methods may be selected, for example, based on whether the transmission is within a gNB channel occupancy time (COT) or outside a gNB COT. A set of channel access methods may be selected, for example, based on the timing of the transmission within a gNB COT. A WTRU may be configured to use omni-directional and directional CCA for one or more intended transmissions, for example, within the first X slots of the COT and use (e.g., only) directional CCA in the intended transmissions in the remaining duration of the COT.

A WTRU may be configured to select one or more (e.g., a set of) channel access methods, for example, based on measurements of the downlink reference signals and/or reported uplink reference signals that may be associated with a set of beams. For example, a WTRU may be configured with DL reference signals that may be transmitted periodically. A WTRU may select a channel access method, for example, based on the received power of an RS during a preconfigured time period.

A WTRU may be configured to select one or more (e.g., a set of) channel access methods, for example, based on a CWS state. A WTRU may perform omni-directional and directional CCA, for example, if the CWS is above a configured threshold. A WTRU may perform directional CCA, for example, if the CWS is below a configured threshold.

A WTRU may be configured to select one or more (e.g., a set of) channel access methods, for example, based on the RRC state of a WTRU. A WTRU (e.g., a WTRU in IDLE mode) may be configured to use directional and omni-directional CCA. A WTRU (e.g., a WTRU in RRC CONNECTED mode) may be configured to use (e.g., only) directional CCA.

A WTRU may be configured to select one or more (e.g., a set of) channel access methods, for example, based on the direction of a sensing beam. For example, a WTRU may be configured to transmit in a (e.g., one) beam direction and perform sensing in one or more other (e.g., different) beam direction(s). A WTRU may (e.g., when transmitting and sensing in different directions) use a different energy detection threshold (e.g., compared to using the same beam) for sensing and transmitting.

An LBT configuration may be selected based on an associated transmission. A WTRU may be configured with parameters for directional LBT. Parameters may include, for example, one or more of the following: beam direction, beamwidth, and/or quasi-collocated reference signal. A WTRU may be configured with multiple LBT configurations (e.g., each with its own set of configurable parameters).

A WTRU may select an appropriate LBT configuration, for example, as a function of an associated transmission. An associated transmission may, for example, (i) trigger the LBT procedure and/or (ii) occur in a COT acquired using the LBT procedure.

Selection of an LBT configuration may depend on or be based on one or more of the following: (i) using the same beam as the beam configured/scheduled for the associated transmission; (ii) using a beam that overlaps a beam configured/scheduled for the associated transmission; (iii) an indication from the gNB; (iv) a parameter of the associated transmission; (v) a type or priority of the associated transmission; and/or (vi) whether the receiving node may perform LBT prior to reception of the transmission.

Selection of an LBT configuration may depend on, for example, using the same beam as the beam configured/scheduled for the associated transmission. For example, a WTRU may use an LBT procedure whose energy detection beam matches (e.g., perfectly) with the energy detection beam of the associated transmission. A (e.g., perfect) match may indicate that the beam direction and beam width of the LBT procedure may be (e.g., essentially or approximately) the same as the beam direction and beam width of the associated transmission. A (e.g., perfect) match may indicate that the quasi-co-location (QCL) RS of the LBT configuration may be (e.g., essentially or approximately) the same as the QCL RS of the associated transmission.

Selection of an LBT configuration may depend on, for example, using a beam that overlaps with the beam configured/scheduled for the associated transmission. For example, a WTRU may use an LBT procedure with a beam that encompasses the configured/scheduled beam of the associated transmission. Encompassing may include, for example, the pattern of the beam used for LBT covering (e.g., at least) the beam configured/scheduled for the associated transmission.

Selection of an LBT configuration may depend on, for example, an indication from the gNB. For example, the WTRU may be configured with a specific LBT configuration for each type of transmission. A WTRU may receive an indication for a specific LBT configuration, for example, in the control signaling configuring or scheduling the associated transmission.

Selection of an LBT configuration may be based on, for example, a parameter of the associated transmission. For example, the timing or the frequency or an RS or QCL RS of the associated transmission may determine an (e.g., appropriate) LBT configuration.

Selection of an LBT configuration may be based on, for example, a type or priority of an associated transmission. For example, a WTRU may select an appropriate LBT configuration based on the priority of a logical channel, a priority indication of a physical channel (e.g., for PUSCH or PUCCH, such as a priority of HARQ-ACK or SR), or whether a grant is configured or dynamically scheduled. In examples, an associated transmission (e.g., a high priority associated transmission) may include repetition over multiple beams. A WTRU may (e.g., in a repetition scenario) select an LBT configuration that enables transmission over multiple beams.

Selection of an LBT configuration may be based on, for example, whether the receiving node may perform LBT prior to reception of the transmission. A transmitting node may use an LBT configuration with a narrower beam, for example, if the receiver node performed Rx LBT.

A WTRU may receive an indication of an LBT configuration that may be used by a gNB to initiate a COT. For example, an LBT configuration may be in a COT structure indication message. An indication may be provided, for example, by one or more of the following: a reference signal or an index of an RS; an (e.g., explicit) identification of the beam(s) used for LBT; a resource that may be used to transmit the indication of the LBT configuration; and/or a timing of the COT.

A WTRU may receive an indication of an LBT configuration via a reference signal or an index of an RS. For example, a WTRU may receive a link (e.g. a QCL) to a reference signal. A gNB may include a link (e.g. a QCL) to a reference signal.

A WTRU may receive an indication of a LBT configuration via an (e.g., explicit) identification of the beam(s) that may be used for LBT. For example, the beam(s) used for LBT may be assigned indices. A gNB may provide the beam indices of the beams on which LBT was performed or succeeded.

A WTRU may receive an indication of an LBT configuration via a resource that may be used to transmit the indication of the LBT configuration.

A WTRU may receive an indication of an LBT configuration via timing of the COT. For example, COTs (e.g., in FBE) may be initiated (e.g., only) at specific time instances. A (e.g., each) time instance may be associated with an LBT configuration.

A WTRU may select an LBT configuration (e.g. to transmit during the gNB-initiated COT) based on the LBT configuration that may be used by the gNB to initiate the COT. A WTRU may receive an indication to update the LBT configuration (e.g., by receiving an update to the COT structure indication, and/or by receiving dynamic signaling instructing the WTRU to update the LBT configuration).

A WTRU may receive an indication of an LBT configuration in a scheduling DCI. For example, a scheduling DCI may include multiple (e.g., two) indices (e.g. two TCI states), such as a first state associated with an LBT configuration (e.g., the LBT configuration that may be used to initiate the COT, and/or the LBT configuration that may be used by the WTRU to perform the scheduled transmission) and a second state associated with the scheduled transmission.

Selection may be made for multiple transmissions. In examples, a WTRU may acquire a COT for a transmission (e.g., using a first set of parameters). The WTRU may be scheduled or configured for a second transmission (e.g., using a second set of parameters) that may fall within the allocated time of the COT. The WTRU may perform an LBT procedure (e.g., a new LBT procedure) associated with the second transmission, for example, depending on the parameters of the LBT used to acquire the COT. The WTRU may perform an LBT procedure (e.g., a new LBT procedure with a configuration that may depend on the parameters of the associated second transmission), for example, if the first transmission led to an LBT configuration using a first beam that is orthogonal to, or doesn't fully encompass, the beam intended for the second transmission.

A WTRU may determine an LBT configuration based on multiple associated transmissions. For example, a WTRU configured/scheduled with multiple transmissions adjacent in time may select an LBT configuration that enables one or more (e.g., all) transmissions occurring within the maximum duration of a COT. A selection may involve the use of a larger beam for the LBT, for example, so that (e.g., all) upcoming associated transmission beams may be covered by the beam of the LBT process.

A WTRU may perform multiple LBT processes (e.g., each using different beams), for example, prior to acquiring a COT. A WTRU may perform associated transmissions during the same COT, for example, based on (e.g., upon) successful channel acquisition over one or more beams.

A selection may be made for a receiver-based LBT. A WTRU may perform receiver-based LBT, for example, to indicate to the transmitter that the WTRU is not suffering interference in the resource where the WTRU may receive a transmission. A WTRU may select a configuration of the LBT (e.g., for receiver-based LBT), for example, based on one or more of the following: (i) an indication from the transmitter; (ii) a parameter of the associated transmission; and/or (iii) timing.

A WTRU may select a configuration of the LBT (e.g., for receiver-based LBT), for example, based on an indication from the transmitter. A WTRU may receive an indication from the transmitter to perform receiver-based LBT using a specific LBT configuration. An indication may be self-contained or may be part of control signaling (e.g., for configuration and/or scheduling) for the associated transmission.

A WTRU may select a configuration of the LBT (e.g., for receiver-based LBT), for example, based on a parameter of the associated transmission. In examples, a WTRU may be configured/scheduled with a transmission. The WTRU may determine the LBT configuration to be used for receiver-based LBT, for example, as a function of the configured/scheduled transmission. A WTRU may determine a (e.g., an appropriate) receiver-based LBT configuration as a function of, for example, an RS or QCL RS of the associated transmission.

A WTRU may select a configuration of the LBT (e.g., for receiver-based LBT), for example, based on timing. For example, a WTRU may cycle through a set of LBT configurations based on the time of the associated transmission or the time the LBT procedure is performed.

LBT configuration pairs may be selected. A WTRU may select multiple LBT configurations (e.g., over multiple beams) for an associated transmission. A selection of beams may, for example, avoid or reduce interference (i) received in a beam the WTRU uses for transmission and/or (ii) in the (e.g., completely) opposite direction (e.g., matching the beam used by the receiver). For example, a WTRU may select (i) a first LBT process with a first beam direction (e.g., matching a beam direction of the associated transmission) and/or (ii) an associated second LBT process with a second beam direction in the opposite direction. The first and second LBT processes may use beams with the same beam width. The first LBT process may use a first beam width that may be determined, for example, based on a parameter of the associated transmission. The second LBT process may use a wider beamwidth (e.g., covering 180 degrees).

A WTRU may be configured with pairs of LBT processes. A WTRU may select a first LBT process based on, for example, a selection method (e.g., as described herein). A WTRU may select a second LBT process, for example, configured to be used with the first LBT process.

A single LBT process may be configured to include multiple beams and/or beamwidths and/or an associated RS. A WTRU may (e.g., in this scenario) perform a single LBT process that may determine the channel acquisition state in multiple beam directions.

A WTRU may use different LBT parameters for each of multiple beams, for example, if/when the WTRU performs LBT on multiple beams for an associated transmission. LBT parameters may include, for example, one or more of the following: (i) an ED threshold; (ii) a CWS; and/or (iii) an LBT type.

LBT parameters may include, for example, an ED threshold. For example, a WTRU may use a higher ED threshold for a beam aligned with the associated transmission and may use a lower ED threshold for a beam in the opposite direction, which may enable the WTRU to be more sensitive to interference that may have a negative impact at the receiver.

LBT parameters may include, for example, a CWS. For example, a WTRU may use a smaller CWS for a beam aligned with an associated transmission and may use a larger CWS for a beam in the opposite direction.

LBT parameters may include, for example, an LBT Type. For example, a WTRU may use an LBT type using multiple CCAs (e.g., LBT Type 4) in a first direction and a one-shot LBT type (e.g., LBT Type 2) in a second direction.

A WTRU may indicate to the gNB the LBT configuration used for a transmission, for example, in a gNB-initiated COT or in a WTRU-initiated COT. In examples (e.g., for a UL transmission in a gNB-initiated COT), the WTRU may receive an indication from the gNB of the LBT configuration used to initiate the COT. The WTRU may not be successful on the same LBT configuration (e.g., or an associated LBT configuration). For example, the WTRU may be successful (e.g., only) on an LBT configuration with a narrower beam than the beam that may be used by the gNB to initiate the COT. The WTRU may send an indication to the gNB of the LBT configuration the WTRU used to acquire the COT. An indication may be transmitted as part of a scheduled transmission (e.g. as UCI) or may be transmitted as an independent signal.

A WTRU may maintain multiple COTs. A COT may be defined by a set of time, frequency, and/or spatial resources. A WTRU may maintain multiple COTs simultaneously on the same set of resource blocks (RBs) (e.g. in the same LBT subband(s)). For example, a WTRU may maintain a first COT using a first LBT configuration and a second COT using a second LBT configuration. Maintenance of the first and second COTs may be valid, for example, if the beams of the first and second LBT configuration do not overlap. The WTRU may maintain a COT timer per LBT configuration (e.g. per spatial COT).

Multiple PDCCH monitoring groups may be maintained, for example, if/when the WTRU maintains multiple spatial COTs. For example, a (e.g., each) beam may be associated with multiple (e.g., two or more) PDCCH monitoring groups. A WTRU may determine what PDCCH monitoring group to use for a beam, for example, depending on whether a COT is active for the beam. Monitoring restrictions may be based on the set of active spatial COTs.

A WTRU may, for example, maintain a (e.g., single) spatial COT (e.g., at any given moment). The WTRU may receive an indication that the LBT configuration has changed. The WTRU may assume that the previous COT has ended, and the next COT (e.g., a new COT, an updated COT, a different COT, an alternate COT, or the like) has begun. The WTRU may restart a COT timer. The determination to restart a COT timer may depend on the LBT configurations used at the beginning of the COT and the updated LBT configuration. The WTRU may assume the original COT continues with a narrower beam, for example, if a second LBT configuration indicates that the beam is a subset of the beam used previously. The WTRU may assume a second COT has begun, for example, if the second LBT configuration indicates that the second beam does not overlap the beam used previously. The WTRU may expect an (e.g., explicit) indication (e.g., of whether a second COT has begun or if the current COT continues), for example, if the second LBT configuration beam partially overlaps the beam used previously.

Channel access failures may occur. A UL LBT failure may indicate (e.g., imply) that a WTRU was not able to acquire the channel for an uplink transmission attempt after a CCA portion of an LBT procedure. A failure may be determined, for example, (i) based on receiving a "notification of LBT failure" and/or (ii) by the WTRU, e.g., among other determination methods. UL LBT success may indicate (e.g., imply) the opposite of what is indicated by UL LBT failure.

A WTRU may change a channel access beam, a beam ID, and/or a characteristic associated with a selected beam for channel access, for example, after x LBT failures, where x>=1. A WTRU may be (pre)configured or (pre)defined to change the UL beam used for channel sensing for the next LBT attempt (e.g., after x LBT failures). A WTRU may be configured with a beam switching pattern or a beam characteristic switching pattern to cycle through (e.g., after each LBT failure). A WTRU may select a different beamwidth for the same beam for CCA after an LBT failure. For example, a WTRU may use a narrower beamwidth and/or a directional LBT after a failing LBT attempt using a wider beamwidth (e.g., omni-directional LBT). A WTRU may determine an interference direction from which to observe interference from another WTRU and/or from which to determine that another WTRU may (e.g., will) interfere on from the gNB's perspective. A WTRU may change a channel access beam, a beam ID, and/or a characteristic associated with the selected beam for channel access, e.g., to avoid the interference direction learned/experienced in a previous LBT attempt (e.g., from a previous a wider beam used or from an omni-directional LBT).

A WTRU may maintain multiple UL LBT failure counters and/or timers (e.g. one per LBT configuration or per beam). A UL LBT failure on a first LBT configuration on a first beam may be declared. A WTRU may (e.g., attempt to) transmit using a second LBT configuration on a second beam (e.g., a beam or LBT configuration having not yet declared UL LBT). A WTRU may determine that one or more (e.g., some or all) LBT configurations (e.g., or beams) declared UL LBT failure. The WTRU may indicate the determination to the gNB. The WTRU may (e.g., successfully) transmit on at least one beam (e.g. using at least one LBT configuration). The WTRU may reset UL failure counters for (e.g., at least) the beam successfully transmitted on (e.g., and one or more other (all) beams).

A WTRU may have more relaxed LBT requirements in one or more frequency bands. A WTRU may (e.g., in relaxed requirement bands) transmit without LBT, short LBT (e.g., or short CCA), for example, after an LBT success with a narrow beam. The WTRU may gain access to a channel that may be occupied by another access point, another WTRU, or a different wireless technology WTRU (e.g., in a non-hidden node scenario), which may be referred to as persistent interference. Persistent interference may be declared, for example, after a number of failed attempts to successfully transmit on the channel. A WTRU may detect persistent interference, for example, based on one or more of the following: (i) measurements of channel conditions, (ii) the number of retransmissions for a given TB, (iii) lack of HARQ feedback for a given uplink transmission, and/or (iv) lack of gNB response for a given uplink transmission (e.g., an RAR after a preamble transmission, an uplink grant after an SR transmission, a HARQ-ACK after a PUSCH transmission, etc.). A WTRU may (e.g., after detection of persistent interference) change (i) a channel access beam, and/or (ii) a beam ID, and/or a characteristic associated with the selected beam, for example, for a transmission or an LBT. A WTRU may (e.g., attempt to) transmit to a different TRP in the cell, for example, after a detecting persistent interference or a number of failed LBT attempts.

A WTRU may (e.g., after detecting persistent interference, a number of retransmissions, and/or a number of UL LBT failure attempts) declare or trigger, for example, one or more of the following: an RLF, a secondary cell group (SCG) failure procedure, a UL consistent LBT failure procedure, a BWP switch, a beam reestablishment procedure, a BFR, and/or an RA procedure. A WTRU may generate a failure reporting MAC CE, for example, after detecting persistent interference and/or a number of UL LBT failure attempts, which may be transmitted on a different UL cell. A MAC CE may include, for example, the cell on which the persistent interference was detected, the BWP, the subband, channel measurements, and/or an indication to switch to a different channel (e.g., on the cell on which the persistent interference was observed).

A WTRU may measure CSI-RS and/or SSBs associated with the maintained beam set. A WTRU may measure CSI-RS and/or SSBs associated with the candidate beam set, which may be conditioned on the lack of a satisfactory beam (e.g., meeting a configured channel condition measurement threshold) in the maintained beam set. A WTRU may trigger a beam reestablishment procedure, for example, if a WTRU does not have a satisfactory beam in the maintained beam set. A WTRU may consider (e.g., determine) a beam unsatisfactory, for example, if a configured channel condition measurement is below threshold, a number of LBT attempts failed on the beam, and/or persistent interference was observed using the beam. A WTRU may (e.g., further) condition triggering beam reestablishment on having at least one beam with a satisfactory measurement in the candidate beam set.

Channel access methods may be (re)selected. A WTRU may be (pre-)configured with multiple channel access methods. A WTRU may be configured to select a first channel access method to be applied for one or more uplink transmissions. A WTRU may be configured to detect persistent interference, e.g., after initial transmissions. The WTRU may detect persistent interference, for example, based on one or more of the following: a number of retransmissions for a transmitted TB above a configured threshold; not receiving a HARQ-ACK feedback for a transmitted UL TB; not receiving a UL grant after transmitting a scheduling request and/or a buffer status report; not receiving a random access response after transmitting a PRACH; or a measurement of channel conditions.

A WTRU may detect persistent interference based on the number of retransmissions for a transmitted TB above a configured threshold. A WTRU may be configured with a counter per transmitted HARQ process ID. The WTRU may increment the counter, for example, if/when the WTRU receives a UL grant with a new data indicator (NDI) non-toggled for the same HARQ process ID. The WTRU may reset the counter, for example, if/when the WTRU receives a UL grant with a NDI toggled for the same HARQ process ID. The WTRU may be configured to detect a persistent interference, for example, if at least one of the counters is above a configured threshold. A WTRU may be configured with a (e.g., single) counter for (e.g., all) transmitted HARQ process IDs. The WTRU may increment the counter, for example, if the WTRU receives a non-toggled NDI for at least one HARQ process ID. The WTRU may be configured to detect persistent interference, for example, if the (e.g., single) counter is above a configured threshold. The configured threshold(s) may be configurable/configured (e.g., semi-statically or dynamically from the gNB) or may be fixed.

A WTRU may detect persistent interference based on not receiving a HARQ-ACK feedback for a transmitted UL TB. A WTRU may be configured to receive a downlink feedback indicator (DFI) for uplink transmission(s). The WTRU may determine that a persistent interference occurred, for example, if the WTRU does not receive the DFI in a configured number of time instances. The WTRU may determine that a persistent interference occurred, for example, if A WTRU does not receive the DFI for N consecutive times.

The WTRU may detect persistent interference based on not receiving a UL grant after transmitting a scheduling request (SR) and/or a buffer status report (BSR). A WTRU may be configured to start a timer based on (e.g., after) transmitting a scheduling request and/or a buffer status report. The WTRU may determine that a persistent interference occurred, for example, if the timer expires and an UL grant has not been received.

The WTRU may detect persistent interference based on not receiving a random access response after transmitting a PRACH. For example, a WTRU may be configured to determine a persistent interference after failing to receive a random-access response, e.g., to N random access attempts.

The WTRU may detect persistent interference based on a measurement of channel conditions. A WTRU may be configured with resource elements and/or resource blocks on which the gNB may not transmit DL signals. The WTRU may determine that persistent interference occurred, for example, if the WTRU detects a transmission on the unused resources with received power below a configured threshold (e.g., for a configured period of time). A WTRU may be configured with sequences for DL RS. The WTRU may measure a correlation between the detected signals and the configured sequences. The WTRU may determine persistent interference based on the correlation. The WTRU may determine persistent interference, for example, if the correlation between the detected signals and the configured sequences is below a threshold.

A WTRU may be configured to select a second channel access method (e.g., for subsequent transmission(s)), for example, based on (e.g., upon) detecting a persistent interference. In examples, a WTRU may be configured to report a persistent interference to the network. A WTRU may indicate (e.g., in a report) to the network (e.g., a gNB) a preferred channel access method. A WTRU may be configured with multiple (e.g., two) channel access methods. For example, a WTRU may be configured (e.g., by a gNB) with a first channel access method and a second channel access method.

Figure 5:
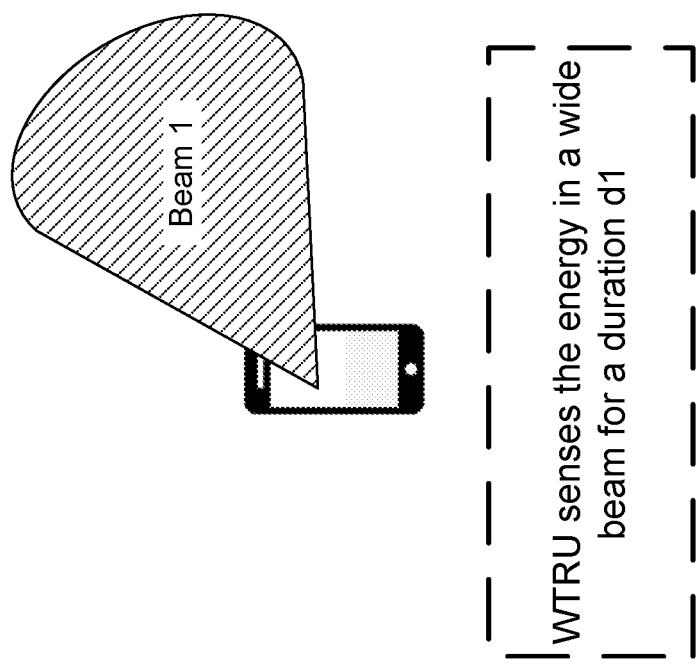
FIG. 5 is a diagram illustrating an example of a channel access method.
Figure 6:
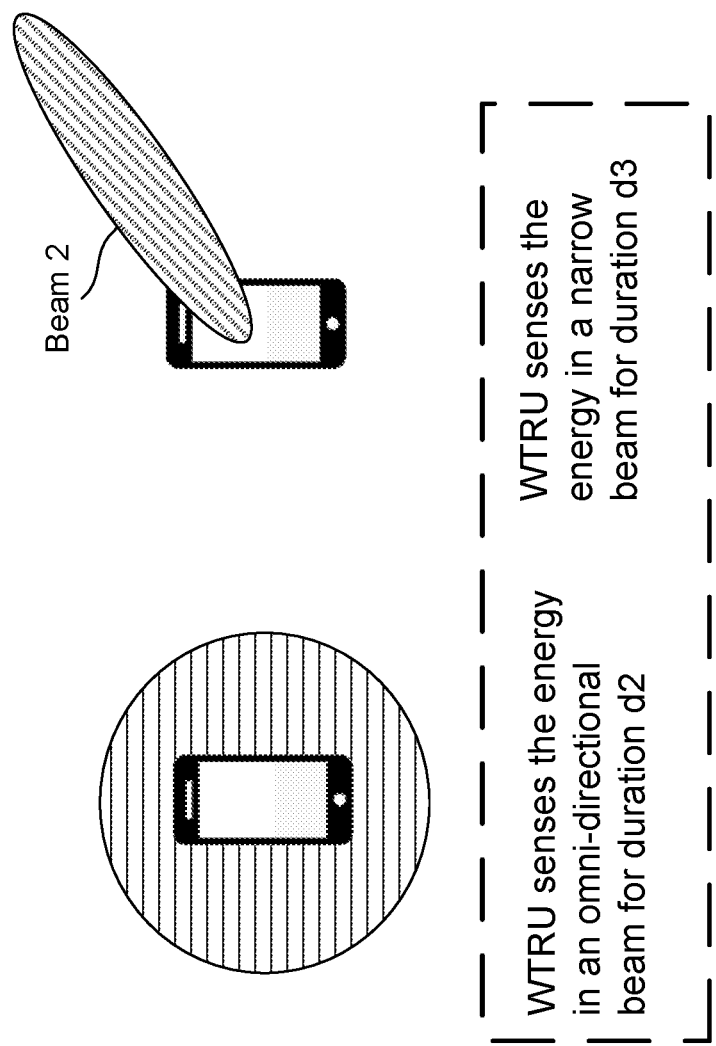
FIG. 6 is a diagram illustrating an example of a channel access method.

FIG. 5 shows an example of a first channel access method. FIG. 6 shows an example of a second channel access method. As shown by example in FIG. 5, a first channel access method may include sensing the channel in a wide beam (beam1) for a duration d1. As shown by example in FIG. 6, a second channel method may include sensing the channel in an omni-directional beam for a duration d2. The WTRU may sense the channel in a narrow beam (e.g., beam2) for a duration d3, for example, if the channel (e.g., sensed for the omni-directional beam) is clear (e.g., no detection of a transmission with an energy and/or a power above a threshold). The WTRU may select the first channel access method. The WTRU may start UL transmission(s), for example, if the first channel access method succeeded. The WTRU may determine (e.g., start determining) whether/if persistent interference occurs. The WTRU may select the second channel access method, for example, if the WTRU detects persistent interference.

A channel access method may be a function of the type of physical channel. A WTRU may, for example, apply one of multiple sensing methods and/or related parameters as a function of the type of physical channel (e.g., for a transmission for which the sensing method is applied as part of an LBT procedure).

A channel access method may be based on a type of channel and/or an ED threshold. For example, a WTRU may determine an applicable ED threshold as a function of whether the channel is PRACH (e.g., a lower value), PUSCH (e.g., a middle range value) and/or PUCCH (e.g., a higher value). A WTRU may perform a selection of the applicable ED threshold, for example, (e.g., only) for a specific type and/or category associated with the LBT procedure. A WTRU may apply a different ED threshold for a (e.g., specific) channel for each of multiple types and/or categories that may be associated with an LBT procedure. A WTRU may be configured with or may determine or select one or more ED thresholds.

A channel access method may be based on a type of channel and ED threshold adjustments. In examples, a WTRU may apply an adjustment (e.g., an offset) to an ED threshold, for example, as a function of whether the channel is PRACH (e.g., a negative offset), PUSCH (e.g., a zero offset) and/or PUCCH (e.g., a positive offset). A WTRU may apply an offset or other adjustment, for example, (e.g., only) for one or more (e.g., specific) types and/or categories that may be associated with the LBT procedure. A WTRU may apply a different offset (or sets thereof) for a specific channel for each of multiple types and/or categories that may be associated with the LBT procedure. Offsets may be a configuration aspect of a WTRU.

A channel access method may be based on a type of channel and a sensing duration. In examples, a WTRU may determine the duration of a sensing period, for example, as a function of whether the channel is PRACH (e.g., a shorter duration), PUSCH (e.g., a middle range duration) and/or PUCCH (e.g., a longer duration). A WTRU may determine a duration, for example, (e.g., only) for a specific type and/or category associated with the LBT procedure. A WTRU may apply a different duration for a (e.g., specific) channel for each of multiple types and/or categories that may be associated with the LBT procedure.

A channel access method may be a function of the type of procedure that initiated the transmission. In examples, a WTRU may apply one of multiple sensing methods and/or related parameters, for example, as a function of the type of procedure associated with the transmission for which the WTRU performs LBT. Procedures related to connectivity management may include, for example, beam failure recovery, radio link recovery (e.g., RRC re-establishment), and/or mobility management (e.g., RRC measurement report, conditional handover). Procedures related to user plane data transmissions may include, for example, PUSCH transmission for data associated with a DRB, SR (e.g., on PUCCH or PRACH) transmission triggered by data (e.g., new data) becoming available at a DRB. A WTRU may perform a similar determination, for example, as a function of the priority of user plane data, e.g., URLLC (e.g., higher priority) or eMBB (e.g., lower priority).

A channel access method may be based on a type of procedure and an ED threshold. A WTRU may determine an applicable ED threshold, for example, as a function of whether the procedure is associated with connectivity management (e.g., a first value) or associated with user plane data transmission (e.g., a second value). A WTRU may select the applicable ED threshold, for example, (e.g., only) for a specific type and/or category associated with the LBT procedure. A WTRU may apply a different ED threshold for a specific procedure for each of multiple types and/or categories that may be associated with the LBT procedure. A WTRU may be configured with, or may select or determine one or more ED thresholds.

A channel access method may be based on a type of procedure and ED threshold adjustments. In examples, a WTRU may apply an offset to an ED threshold, for example, as a function of whether the procedure is associated with connectivity management (e.g., a first value) or associated with user plane data transmission (e.g., a second value). A WTRU may apply an offset, for example, (e.g., only) for a one or more (e.g., specific) types and/or categories that may be associated with the LBT procedure. A WTRU may apply a different offset (e.g., or sets thereof) for a specific procedure (e.g., or type thereof) for each of multiple types and/or categories that may be associated with the LBT procedure. A WTRU may be configured with, or may select or determine one or more offsets.

A channel access method may be based on a type of procedure and/or a sensing duration. In examples, a WTRU may determine a duration of a sensing period, for example, as a function of whether the procedure is associated with connectivity management (e.g., a first value) or a user plane data transmission (e.g., a second value). A WTRU may determine a duration, for example, (e.g., only) for a (e.g., specific) type and/or category that may be associated with the LBT procedure. A WTRU may apply a different duration for a (e.g., specific) procedure for each of multiple types and/or categories that may be associated with the LBT procedure.

Figure 7:
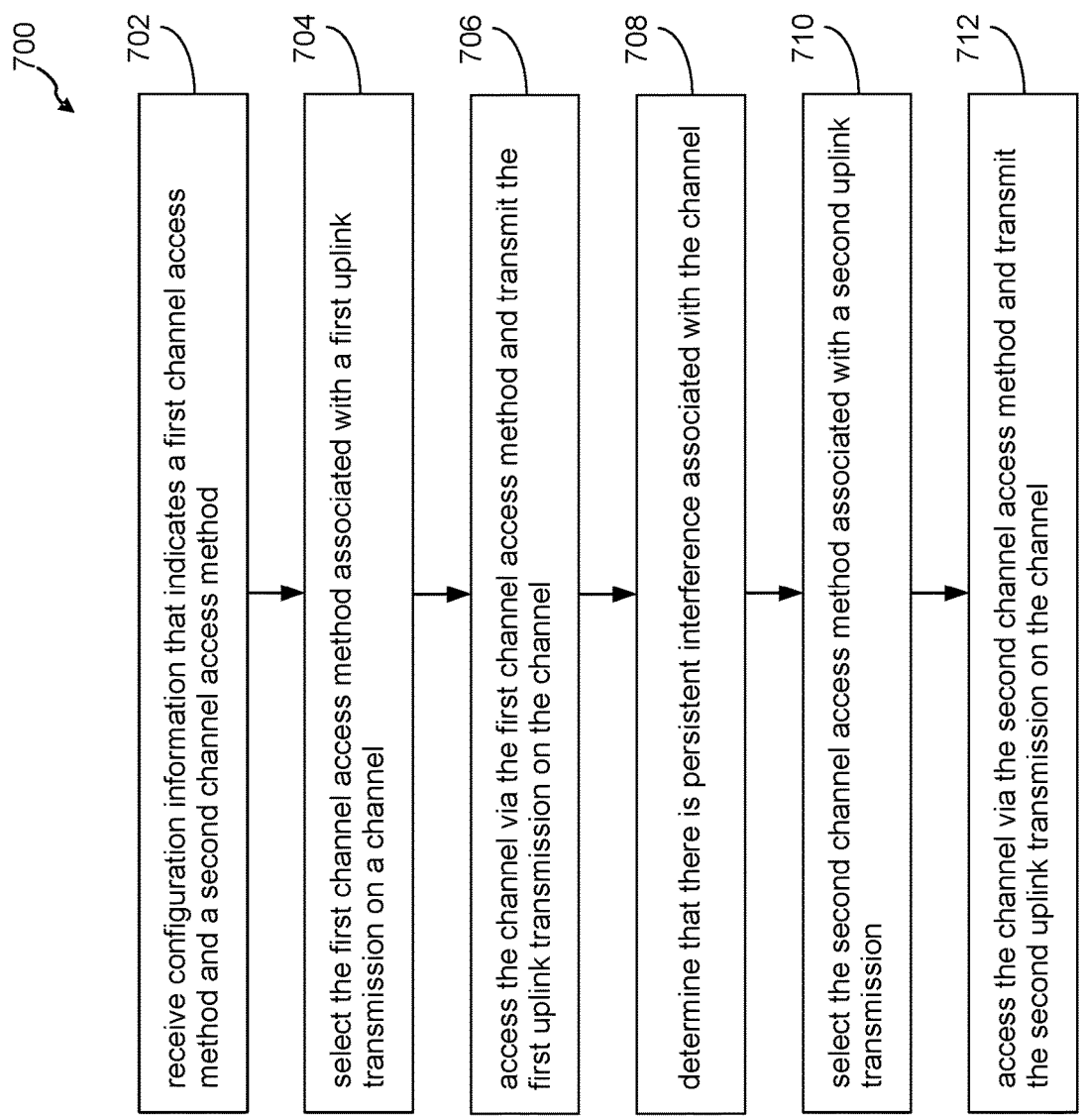
FIG. 7 is illustrates an example channel access associated with persistent interference.

FIG. 7 is illustrates an example of channel access associated with persistent interference (e.g., including feature(s) disclosed herein).

At 702, a WTRU may receive configuration information that indicates a first channel access method and a second channel access method. For example, first and second channel access methods may be different based on one or more of the following: a spatial filter setting; a sensing duration; an energy detection threshold; a contention window size; a priority of the transmission triggering channel access procedure; beam direction(s); beam width(s); ED threshold(s); and/or the like.

At 704, the WTRU may select the first channel access method associated with a first uplink transmission on a channel. For example, a WTRU may be configured to select a channel access method based on one or more of the following: a channel access category indicated by a gNB (e.g., LBT type); the type of transmission; a priority of a transmission; a resource intended for transmission; a physical channel or transport channel associated with the transmission; the WTRU's procedure(s); a transmission parameter of the associated uplink transmission; a channel access priority class; a timing of a transmission; a DL RS or UL RS; measurements of a DL RS and/or reported UL RS associated with a beam; (x) a CWS state; (xi) an RRC state; and/or (xii) a direction of a sensing beam.

At 706, the WTRU may access the channel via the first channel access method and transmit the first uplink transmission on the channel. The first channel access method may comprise the channel being sensed for a first duration using a first beam. The first beam may be a directional beam (e.g., a wide or narrow beam), an omnidirectional beam or a multi-directional beam. For example, as shown in FIG. 3, the first channel access method may include sensing the energy in a channel using an omni-directional beam for a duration (e.g., d1) and/or a directional beam for a duration (e.g., d1 or a different duration). For example, as shown in FIG. 4, the first channel access method may include sensing the energy in a channel using an omni-directional beam for a duration (e.g., d1) and/or a multi-directional beam for a duration (e.g., d1 or a different duration). For example, a WTRU may use a narrower beamwidth and/or directional LBT after a failing or successful LBT attempt with a wider beamwidth (e.g., omni-directional LBT). The WTRU may start UL transmission(s), for example, if the first channel access method succeeded.

At 708, the WTRU may determine that there is persistent interference associated with the channel. A WTRU may determine persistent interference associated with the channel, for example, by performing one or more actions, such as one or more of the following: measuring a periodic downlink reference signal, determining a number of retransmissions performed for an uplink transport block, determining a failure to receive a HARQ ACK or HARQ NACK associated with the first transmission, and/or determining expected responses for transmissions. For example, the WTRU may detect persistent interference based on one or more of the following: measurements of channel conditions; the number of retransmissions for a transmitted TB (e.g., based on a threshold); lack of HARQ feedback for an uplink transmission (e.g., not receiving a HARQ-ACK feedback for a transmitted UL TB), lack of gNB response for a given uplink transmission (e.g., not receiving an RAR after a preamble transmission, not receiving an uplink grant after an SR and/or BSR transmission, not receiving a HARQ-ACK after a PUSCH transmission, etc.); and/or reception of a persistent interference indication (e.g. from the gNB) in a DCI, MAC CE or RRC message.

At 710, the WTRU may select the second channel access method associated with a second uplink transmission. For example, as shown in FIG. 5, a first channel access method may include sensing the channel in a wide beam (beam1) for a duration d1. As shown by example, in FIG. 6, a second channel method may include sensing the channel in an omni-directional beam for a duration d2 and/or sensing the channel in a narrow beam (e.g., beam2) for a duration d3, for example, if the channel (e.g., sensed for the omni-directional beam) is clear (e.g., no detection of a transmission with an energy and/or a power above a threshold). The WTRU may select the first channel access method shown in FIG. 5 and may start UL transmission(s), for example, if the first channel access method succeeded. The WTRU may select the second channel access method shown in FIG. 6, for example, if the WTRU detects persistent interference.

At 712, a WTRU may access the channel via the second channel access method and transmit the second uplink transmission on the channel. The second channel access method may comprise the channel being sensed for a second duration using a second beam and/or the channel being sensed for a third duration using a third beam. The second beam may be an omni-directional beam and the third beam may be a directional beam, or vice versa. For example, as shown in FIG. 6, second channel method may include sensing the channel in an omni-directional beam for a duration d2 and/or sensing the channel in a narrow beam (e.g., beam2) for a duration d3, for example, if the channel (e.g., sensed for the omni-directional beam) is clear (e.g., no detection of a transmission with an energy and/or a power above a threshold). The WTRU may start UL transmission(s), for example, if the second channel access method succeeded. The WTRU may access the channel via the first channel access method after accessing the channel via the second channel access method. The WTRU may determine to access the channel via a first channel access method if it determines there is no longer persistent interference. The WTRU may determine to access the channel via a first channel access method if a certain amount of time has elapsed since persistent interference was determined to be present. The WTRU may determine to access the channel via a first channel access method upon reception of an indication to do so (e.g. from the gNB).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
receive configuration information that indicates a first channel access method and a second channel access method, wherein the first access method is associated with using a first beam width, and wherein the second access method is associated with using a second beam width;
select the first channel access method for a first uplink transmission on a channel;
access the channel via the first channel access method and transmit the first uplink transmission on the channel;
determine that a condition associated with the channel is satisfied, wherein the condition is determined to be satisfied based on one or more of: a determination of a number of retransmissions of an uplink transport block exceeding a first threshold, or a determination of a failure to receive feedback associated with a number of transmissions that exceed a second threshold;
based on the determination the condition associated with the channel is satisfied, select the second channel access method for a second uplink transmission; and
access the channel via the second channel access method and transmit the second uplink transmission on the channel.

2. The WTRU of claim 1, wherein the first channel access method comprises the channel being sensed for a first duration using a first beam.

3. The WTRU of claim 2, wherein the second channel access method comprises at least the channel being sensed for a second duration using a second beam.

4. The WTRU of claim 3, wherein the second beam is an omni-directional beam.

5. The WTRU of claim 4, wherein the first beam is a first directional beam.

6. The WTRU of claim 3, wherein the second channel access method further comprises the channel being sensed for a third duration using a third beam.

7. The WTRU of claim 6, wherein the third beam is a second directional beam.

8. The WTRU of claim 5, wherein the processor is further configured to determine one or more parameters of a directional beam based on one or more parameters of a beam of an associated transmission.

9. The WTRU of claim 6, wherein the one or more parameters of the beam of the associated transmission comprise at least a beam direction.

10. A method comprising:
receiving configuration information that indicates a first channel access method and a second channel access method, wherein the first access method is associated with using a first beam width, and wherein the second access method is associated with using a second beam width;
selecting the first channel access method for a first uplink transmission on a channel;
accessing the channel via the first channel access method and transmit the first uplink transmission on the channel;
determining that a condition associated with the channel is satisfied, wherein the condition is determined to be satisfied based on one or more of: a determination of a number of retransmissions of an uplink transport block exceeding a first threshold, or a determination of a failure to receive feedback associated with a number of transmissions that exceed a second threshold;
based on the determination the condition associated with the channel is satisfied, selecting the second channel access method for a second uplink transmission; and
accessing the channel via the second channel access method and transmit the second uplink transmission on the channel.

11. The method of claim 10, wherein the first channel access method comprises the channel being sensed for a first duration using a first beam.

12. The method of claim 11, wherein the second channel access method comprises the channel being sensed for a second duration using a second beam and the channel being sensed for a third duration using a third beam.

13. The method of claim 12, wherein the second beam is an omni-directional beam, and wherein the first beam is a first directional beam and the third beam is a second directional beam.

14. The method of claim 13, further comprising determining one or more parameters of a directional beam based on one or more parameters of a beam of an associated transmission.

15. The method of claim 14, wherein the one or more parameters of the beam of the associated transmission comprise at least a beam direction.

* * * * *